United States Patent [19]

Yamaoka

[11] Patent Number: 5,219,414
[45] Date of Patent: Jun. 15, 1993

[54] VARIABLE DAMPING FORCE SHOCK ABSORBER WITH STROKE DEPENDENT VARIATION CHARACTERISTICS OF DAMPING FORCE

[75] Inventor: Fumiyuki Yamaoka, Kanagawa, Japan

[73] Assignee: Atsugi Unisia Corporation, Japan

[21] Appl. No.: 814,221

[22] Filed: Dec. 23, 1991

Related U.S. Application Data

[63] Continuation of Ser. No. 513,891, Apr. 24, 1990, abandoned.

[30] Foreign Application Priority Data

| Apr. 24, 1989 | [JP] | Japan | 1-104110 |
| Apr. 24, 1989 | [JP] | Japan | 1-104111 |
| Apr. 24, 1989 | [JP] | Japan | 1-104112 |

[51] Int. Cl.⁵ .................. F16F 9/48; F16F 9/49
[52] U.S. Cl. .................. 188/284; 188/322.14; 188/322.15
[58] Field of Search .......... 188/284, 317, 282, 315, 188/322.14, 322.15

[56] References Cited

U.S. PATENT DOCUMENTS

| 1,445,615 | 2/1923 | Ferres | 188/284 X |
| 2,456,736 | 12/1948 | Rossman | 188/284 |
| 2,599,477 | 6/1952 | Patriguin | 188/284 |
| 4,004,662 | 1/1977 | Sorgatz et al. | 188/284 |
| 4,352,417 | 10/1982 | Stinson | 188/322.15 |
| 4,452,436 | 6/1984 | Gute | 188/317 X |
| 4,615,420 | 10/1986 | Mourray | 188/282 X |
| 4,821,852 | 4/1989 | Yokoya | 188/282 |
| 4,830,152 | 5/1989 | Rauert et al. | 188/282 |
| 4,905,799 | 3/1990 | Yamaoka et al. | 188/282 X |

FOREIGN PATENT DOCUMENTS

| 123253 | 10/1944 | Australia | 188/284 |
| 154382 | 12/1953 | Australia | . |
| 164497 | 8/1955 | Australia | . |
| 574174 | 6/1988 | Australia | . |
| 811319 | 8/1951 | Fed. Rep. of Germany | . |
| 939657 | 3/1956 | Fed. Rep. of Germany | . |
| 1050130 | 2/1959 | Fed. Rep. of Germany | 188/317 |
| 1176498 | 8/1964 | Fed. Rep. of Germany | . |
| 1430494 | 4/1970 | Fed. Rep. of Germany | 188/284 |
| 63-203939 | 8/1988 | Japan | . |
| 1489350 | 10/1977 | United Kingdom | . |
| 2180621 | 4/1987 | United Kingdom | 188/284 |

*Primary Examiner*—George E. A. Halvosa
*Attorney, Agent, or Firm*—Ronald P. Kananen

[57] ABSTRACT

A shock absorber has a spring disc to close one end of a fluid path defined through a piston for generating damping force in response to piston stroke in one of bounding and rebounding direction. A coil spring is also provided for providing additional spring force for flow restriction and thus increasing damping force to be generated in response to the piston stroke in one of the bounding and rebounding directions. The coil spring is so oriented to become active in response to a piston stroke in a magnitude greater than a predetermined value and greater than a piston stroke criteria which defines neutral range of the piston stroke.

12 Claims, 19 Drawing Sheets

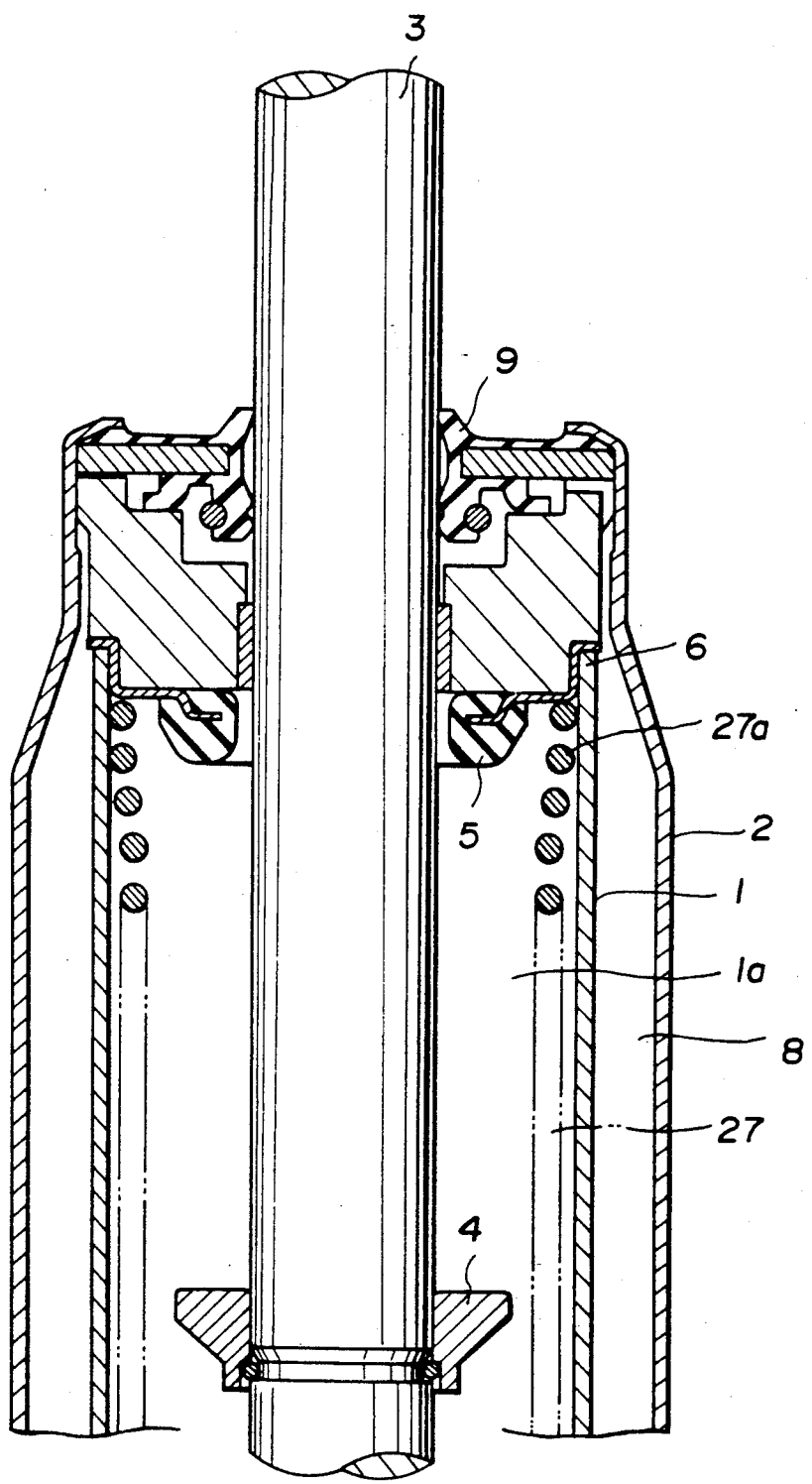

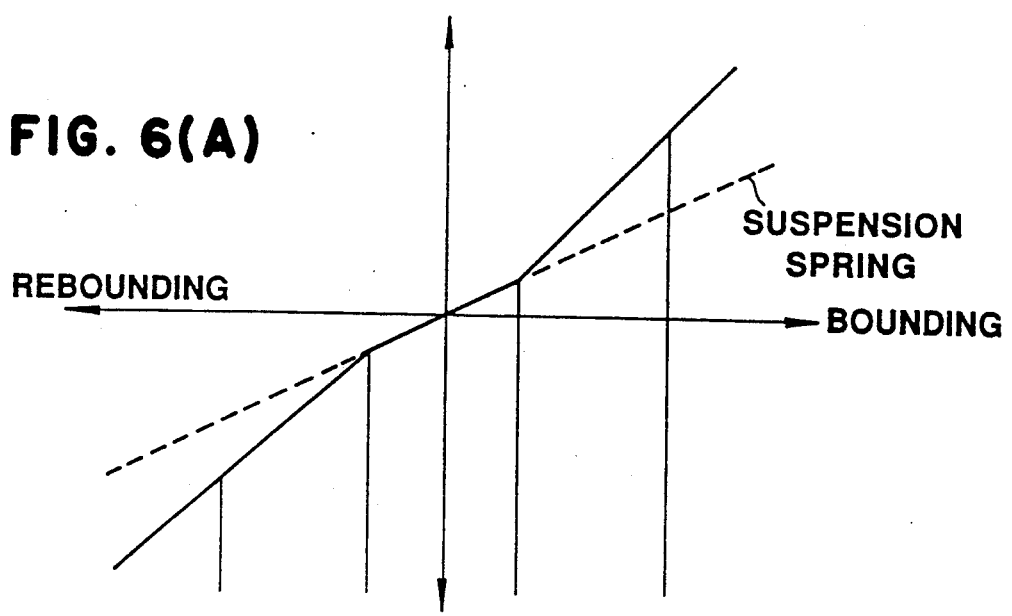
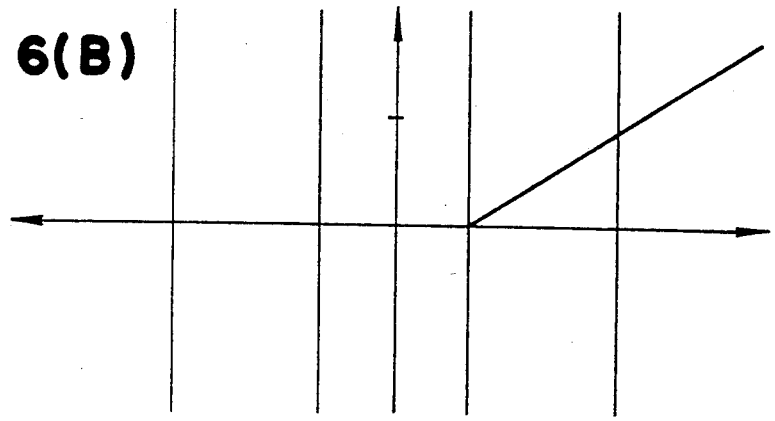
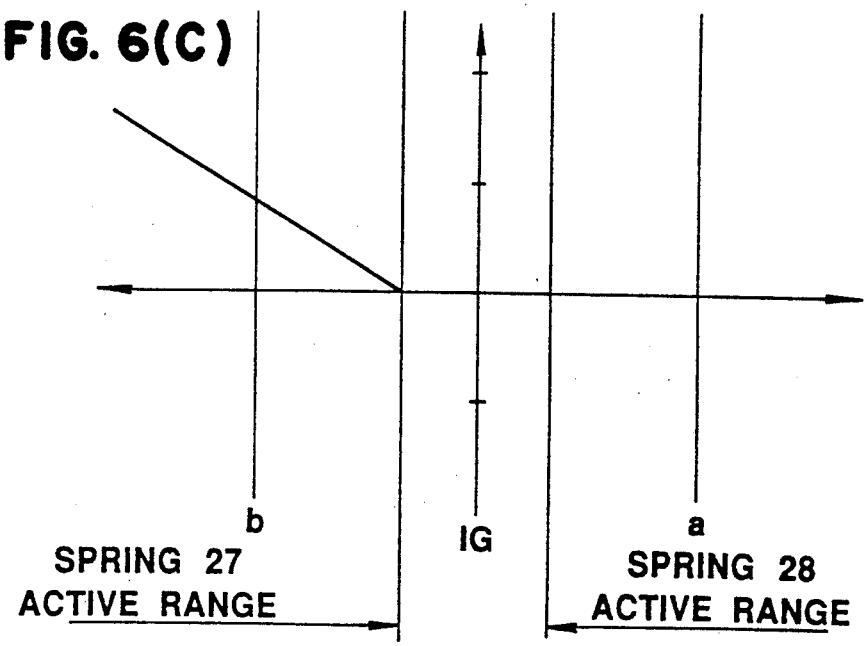

FIG. 7(A)   FIG. 7(B)   FIG. 7(C)

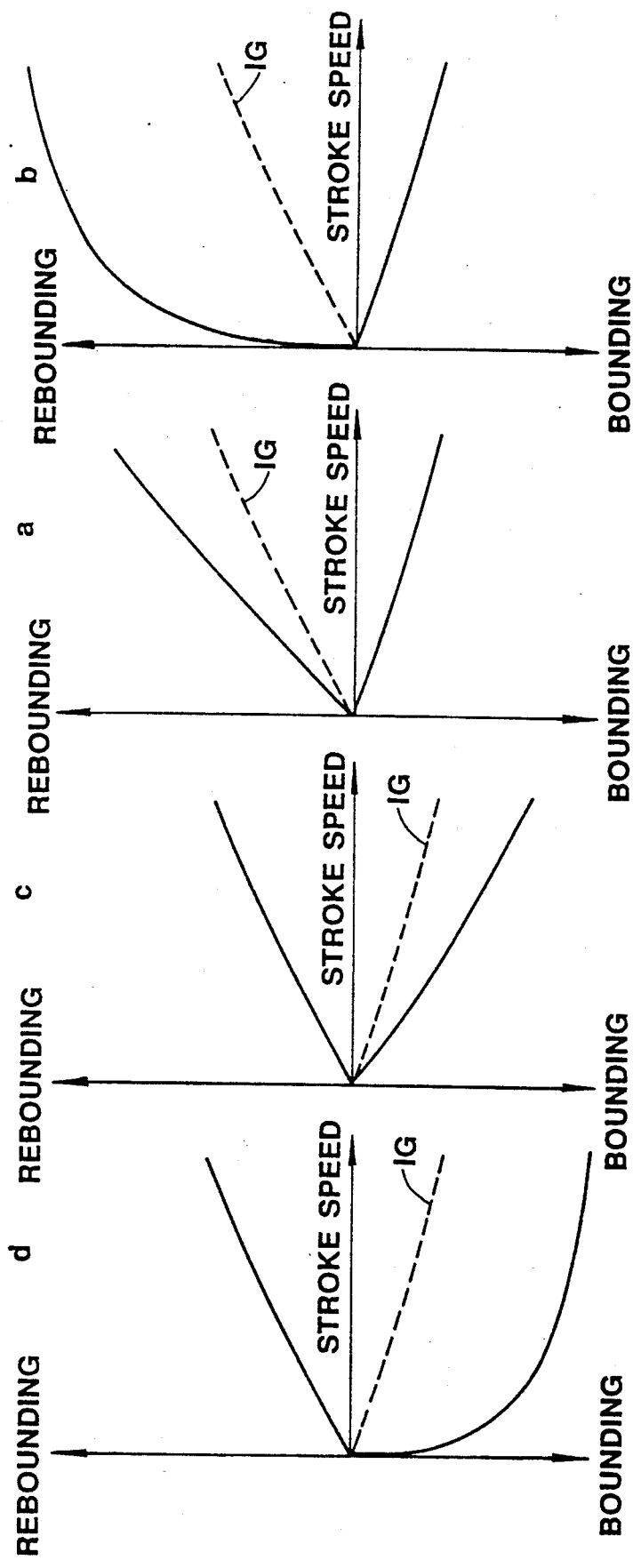

VARIABLE DAMPING FORCE SHOCK ABSORBER WITH STROKE DEPENDENT VARIATION CHARACTERISTICS OF DAMPING FORCE

This application is a continuation of application Ser. No. 07/513,891 filed Apr. 24, 1990, now abandoned.

BACKGROUND OF THE INVENTION

1. Field of the Invention

The present invention relates generally to a variable damping force shock absorber for an automotive suspension. More specifically, the invention relates to a shock absorber which has variable damping characteristics relative to stroke of relative displacement between a vehicular body and a suspension member rotatably supporting a road wheel for enhanced damping performance.

2. Description of the Background Art

Japanese Patent First Publication 63-203939 discloses a variable damping force shock absorber which is variable of damping characteristics depending upon piston stroke. In the disclosed construction, a spring disc is provided for openably closing a fluid flow path formed through the piston for providing restriction for fluid flow therethrough and thus generating damping force. A coil spring is associated with the spring disc. In the shown construction, the coil spring is active on the lower spring disc for exerting spring force onto the spring disc during piston bounding stroke. As can be appreciated, the spring force to be exerted to the spring disc by the coil spring increases according to increasing of the piston stroke in bounding direction. On the other hand, the spring force as integrated force of the spring disc and the coil spring is active to depress the spring disc in a direction for closing the fluid flow path for permitting working fluid to flow from an upper fluid chamber to a lower fluid chamber. Therefore, at the initial stage of piston rebounding stroke subsequent to the piston bounding stroke, fluid force overcoming the integrated spring force is required. By this, at the initial stage of the rebounding piston stroke, increased magnitude of damping force can be obtained. According to expansion of the coil spring due to piston rebounding motion, the spring force to be exerted on the spring disc is gradually decreased. Such variation characteristics of the damping force assures vehicular driving stability.

In such conventional shock absorber, since higher response to the piston stroke is required, the coil spring is constantly in contact with the spring disc in such a manner that the spring force exerted to the latter can be approximately zero at the piston neutral position. This means that the increased spring force is generated in response even to substantially small stroke of piston vibration. As a result, the integrated spring force of the coil spring and the spring disc is active for restricting deformation of the spring disc. Combination of the coil spring and spring disc may cause substantial increase of the spring coefficient which leads degradation of riding comfort.

SUMMARY OF THE INVENTION

Therefore, it is an object of the present invention to provide a shock absorber which can solve the defect in the prior art.

Another object of the invention is to provide a shock absorber which can provide non-linear damping force variation characteristics to rapidly build-up relatively large magnitude of damping force upon reversal of piston stroke direction and to maintain damping force substantially small in a piston stroke range in the vicinity of the neutral position of the piston.

In order to accomplish aforementioned and other objects, a shock absorber, according to the present invention, has a spring disc to close one end of a fluid path defined through a piston for generating damping force in response to piston stroke in one of bounding and rebounding direction. A coil spring is also provided for providing an additional spring force for flow restriction and thus increasing damping force to be generated in response to the piston stroke in one of the bounding and rebounding directions. The coil spring is so oriented to become active in response to a piston stroke in a magnitude greater than a predetermined value and greater than a piston stroke criteria which defines neutral range of the piston stroke.

According to one aspect of the invention, a variable damping force shock absorber for an automotive suspension comprises:

a hollow cylinder defining an interior space filled with a working fluid;

a piston associated with a piston rod for thrusting movement therewith, the piston separating the interior space of the cylinder into first and second fluid chambers;

a first fluid passage means defining a first fluid passage through the piston for fluid communication between the first and second fluid chambers during piston bounding stroke;

a second fluid passage means defining a second fluid passage through the piston for fluid communication between the first and second fluid chambers during piston rebounding stroke;

a first valve means associated with the first fluid passage means for resiliently blocking the first fluid passage for restricting fluid flow therethrough, the first valve means being responsive to fluid pressure difference generated by the piston rebounding stroke for causing deformation to vary fluid flow restriction magnitude;

a second valve means associated with the second fluid passage means for resiliently blocking the second fluid passage for restricting fluid flow therethrough, the second valve means being responsive to fluid pressure difference generated by the piston bounding stroke for causing deformation to vary fluid flow restriction magnitude;

a first auxiliary spring means cooperative with the first valve means for providing auxiliary spring force for restricting deformation of the first valve means, the first auxiliary spring means being arranged to have an active range axially offset in bounding direction in a first given magnitude so that the auxiliary spring force becomes active on the first valve means after a given magnitude of piston bounding stroke; and a second auxiliary spring means cooperative with the second valve means for providing auxiliary spring force for restricting deformation of the second valve means, the second auxiliary spring means being arranged to have an active range axially offset in rebounding direction in a second given magnitude so that the auxiliary spring force becomes active on the second valve means after a given magnitude of piston bounding stroke.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIGS. 1(A), 1(B) and 1(C) are series of sections showing the first embodiment of a variable damping force shock absorber according to the present invention;

FIGS. 6(A), 6(B) and 6(C) are chart showing active ranges of coil springs relative to piston stroke;

FIGS. 7(A), 7(B) and 7(C) are chart showing damping force variation characteristics at various stroke points of a piston in the second embodiment of the shock absorber;

FIGS. 13(A), 13(B), 13(C) and 13(D) are chart showing damping force variation characteristics at various stroke points of a piston in the third embodiment of the shock absorber.

DESCRIPTION OF THE PREFERRED EMBODIMENT

Figure 1A:
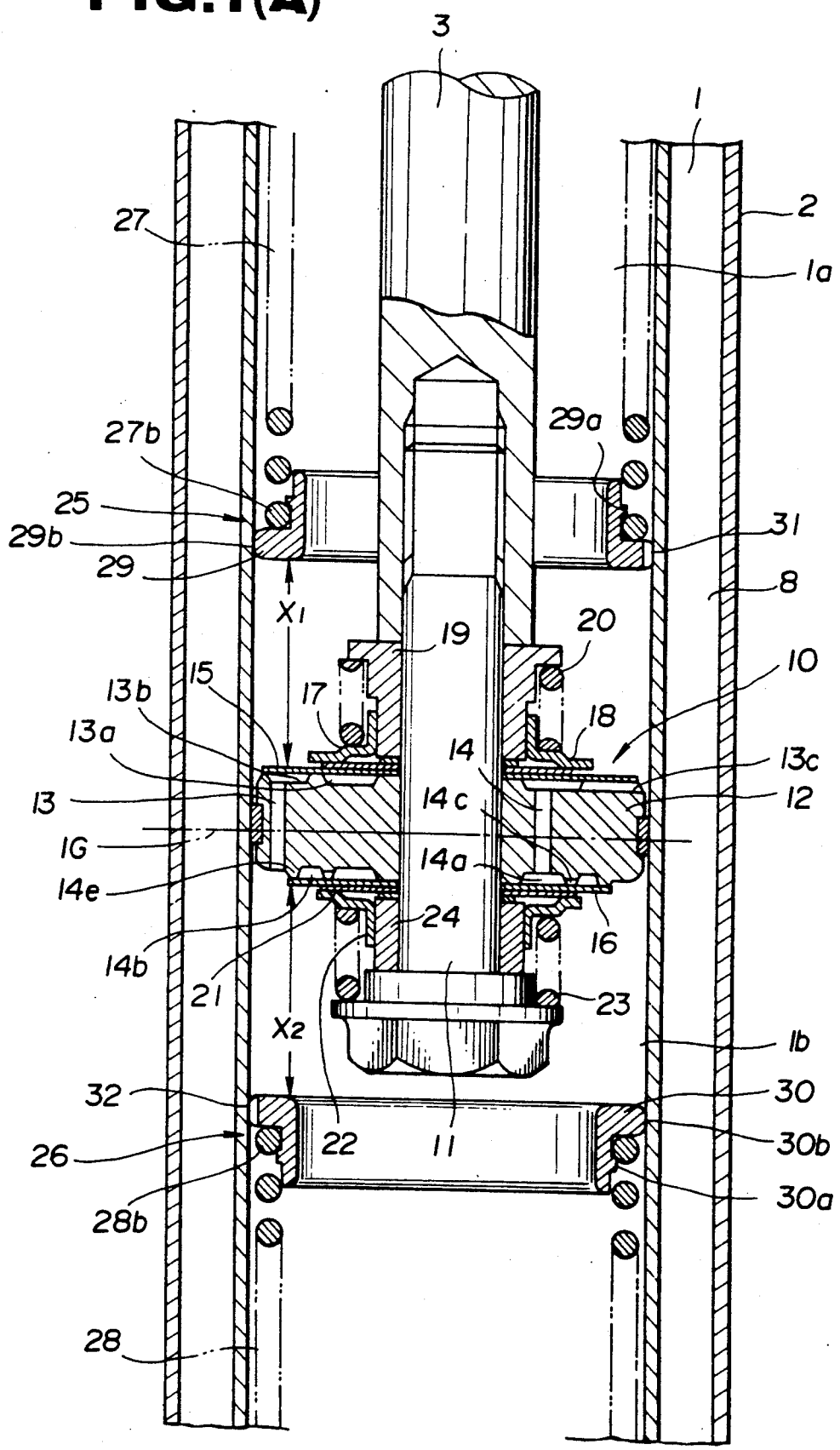
Figure 1C:
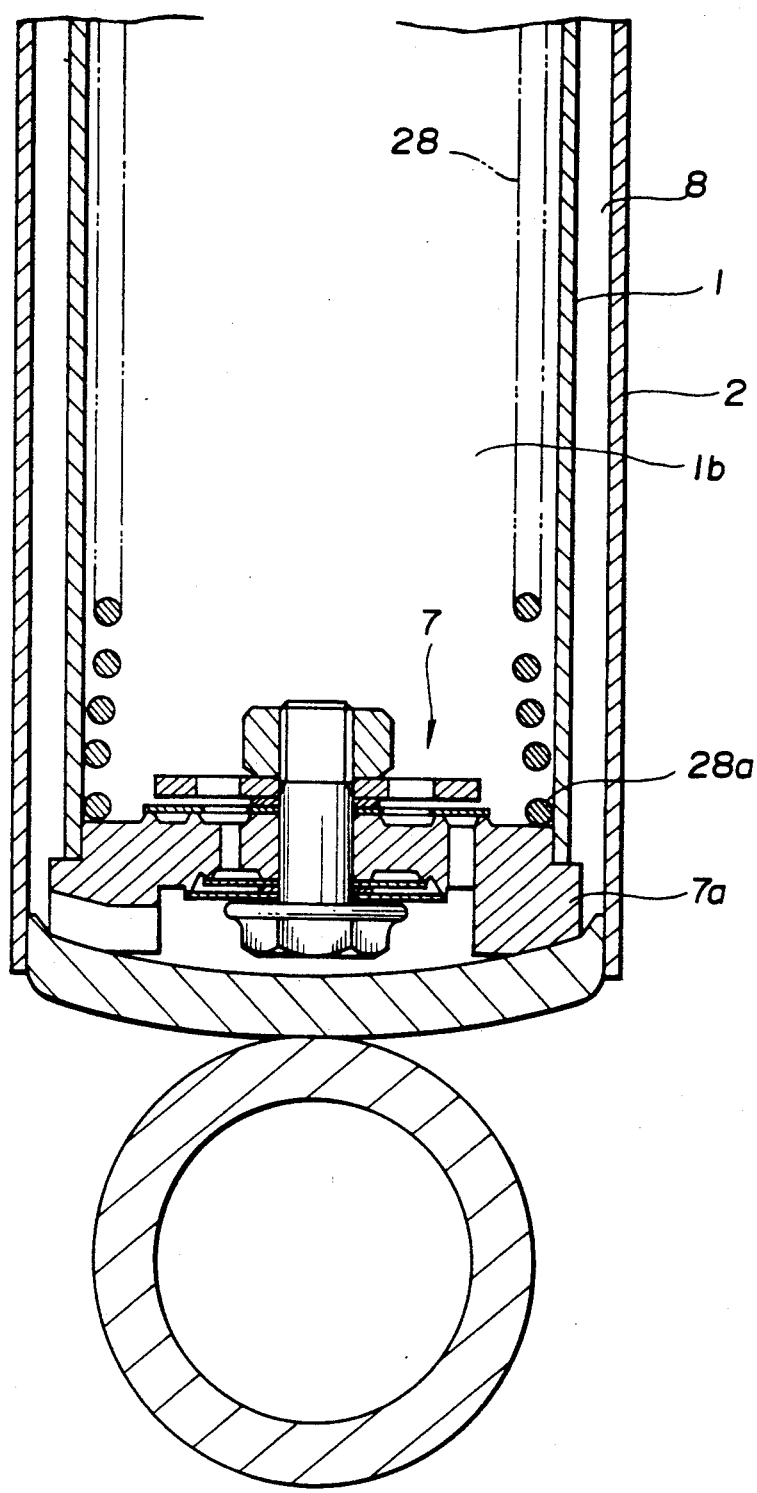

Referring now to the drawings, particularly to FIGS. 1(A), 1(B) and 1(C), the first embodiment of a variable damping force shock absorber, according to the present invention, is illustrated in a form divided into three different portions. The shown embodiment is directed to a twin tube type double action shock absorber, which comprises an inner cylinder tube 1 defining a hollow space therein, and an outer cylinder tube 2 coaxially arranged with the inner cylinder tube and defining therebetween a cross-sectionally annular reservoir chamber 8. The top end of the inner and outer cylinder tubes 1 and 2 are closed by a closure plug in liquid tight fashion. The closure plug 1a carries a bumper retainer 6 which retains a rebounding bumper 5 made of rubber, synthetic rubber or equivalent resilient or elastic material. Opposing the rebounding bumper 5, a rebounding stopper 4 is fixedly secured on a piston rod 3 so as to restrict rebounding stroke of the piston rod, as shown in FIG. 1(B). A seal ring 9 is also provided for establishing liquid tight seal between the outer periphery of the piston rod 3.

A bottom valve assembly 7 is fitted onto the lower end of the inner cylinder 1 for separating the interior space of the inner cylinder and the reservoir chamber 8. The reservoir chamber 8 includes a gas chamber filled with a gaseous working medium for accumulating working hydraulic fluid which will be hereafter referred to as working fluid.

A piston 10 is secured onto the lower end of the piston rod 3 by means of a mounting bolt 11 for thrusting movement together with the piston rod 3. The piston 10 separates the interior space of the inner cylinder tube 1 to define upper and lower fluid chambers 1a and 1b which are filled with working fluid. The piston 10 has a piston body 12 which internally defines a fluid path 13 for fluid flow from the upper fluid chamber 1a to the lower fluid chamber 1b during piston bounding stroke, and a fluid path 14 for fluid flow from the lower fluid chamber 1b to the upper fluid chamber 1a during piston rebounding stroke. The former fluid path 13 will be hereafter referred to as "bounding stroke path". Also, the later fluid path 14 will be hereafter referred to as "rebounding stroke path". An upper valve plate 15 is provided in opposition to inner and outer annular grooves 13a and 13b formed on the upper surface of the piston body 12. The inner annular groove 13a is in fluid communication with the upper fluid chamber 1a via one or more radial paths 13c. On the other hand, the outer annular groove 13b is in fluid communication with the upper end opening of the bounding fluid path 13. The upper valve plate thus resiliently closes the upper end of the inner and outer annular grooves 13a and 13b. A lower valve plate 16 is also provided in opposition to the lower surface of the piston body 12 for resiliently closing inner and outer annular grooves 14a and 14b. The inner annular groove 14a is in communication with the lower end opening of the rebounding stroke path 14. On the other hand, the outer annular groove 14b is in fluid communication with the inner annular groove 14a via one or more radial orifices 14c.

The upper valve plate 15 is formed of a resiliently deformable leaf spring so as to resiliently establish sealing contact with the associated portion of the upper surface of the piston body 12. The upper valve plate 15 is associated with a coil spring 20 disposed between a spring seat 18 and a spring retainer 19 so as to exert spring force to the upper valve plate 15. A smaller diameter disc 17 is interposed between the spring seat 18 and the upper valve plate 15 for uniformity of distribution of the spring force. Similarly, the lower valve plate 16 is formed of a resiliently deformable leaf spring. The lower valve plate 16 is associated with a coil spring 23 interposed between a spring seat 22 and the bolt head of the mounting bolt 11. A smaller diameter disc 21 is disposed between the spring seat 22 and the lower valve plate 16 for uniform distribution of the spring force.

An upper auxiliary coil spring 27 is disposed within the upper fluid chamber 1a. The upper auxiliary coil spring 27 is seated onto the bumper retainer 6 at the upper end 27a and onto an annular spring seat member 29. On the other hand, a lower auxiliary coil spring 28 is disposed within the lower fluid chamber 1b. The lower auxiliary coil spring 28 is seated on a bottom valve body 7a at the lower end 28a and onto an annular spring seat member 30. Respective of the lower end 27b and the upper end 28b of the upper and lower auxiliary coil springs 27 and 28 are secured on respectively associated annular spring seat members 29 and 30 by the projections 29a and 29b radially extending from the outer peripheries. The annular spring seat members 29 and 30 are formed with radially extending flanges having diameters substantially coincident with the internal diameter of the inner cylinder tube 1. Axially extending grooves 31 and 32 are formed on the outer periphery of the flanges of the annular spring seat members 29 and 30 for minimizing resistance of axial movement thereof. The upper auxiliary coil spring 27 and the annular spring seat member 29 form an upper spring assembly, and the lower auxiliary coil spring 28 and the annular spring seat member 30 form a lower spring assembly 26. As can be seen, the inner diameters of the annular spring seat members 29 and 30 are so selected as to be greater than the external diameters of the spring seats 18 and 22 and thus to contact with the portion of the upper and lower valve plates in the vicinity of the outer circumferences.

Figure 2:
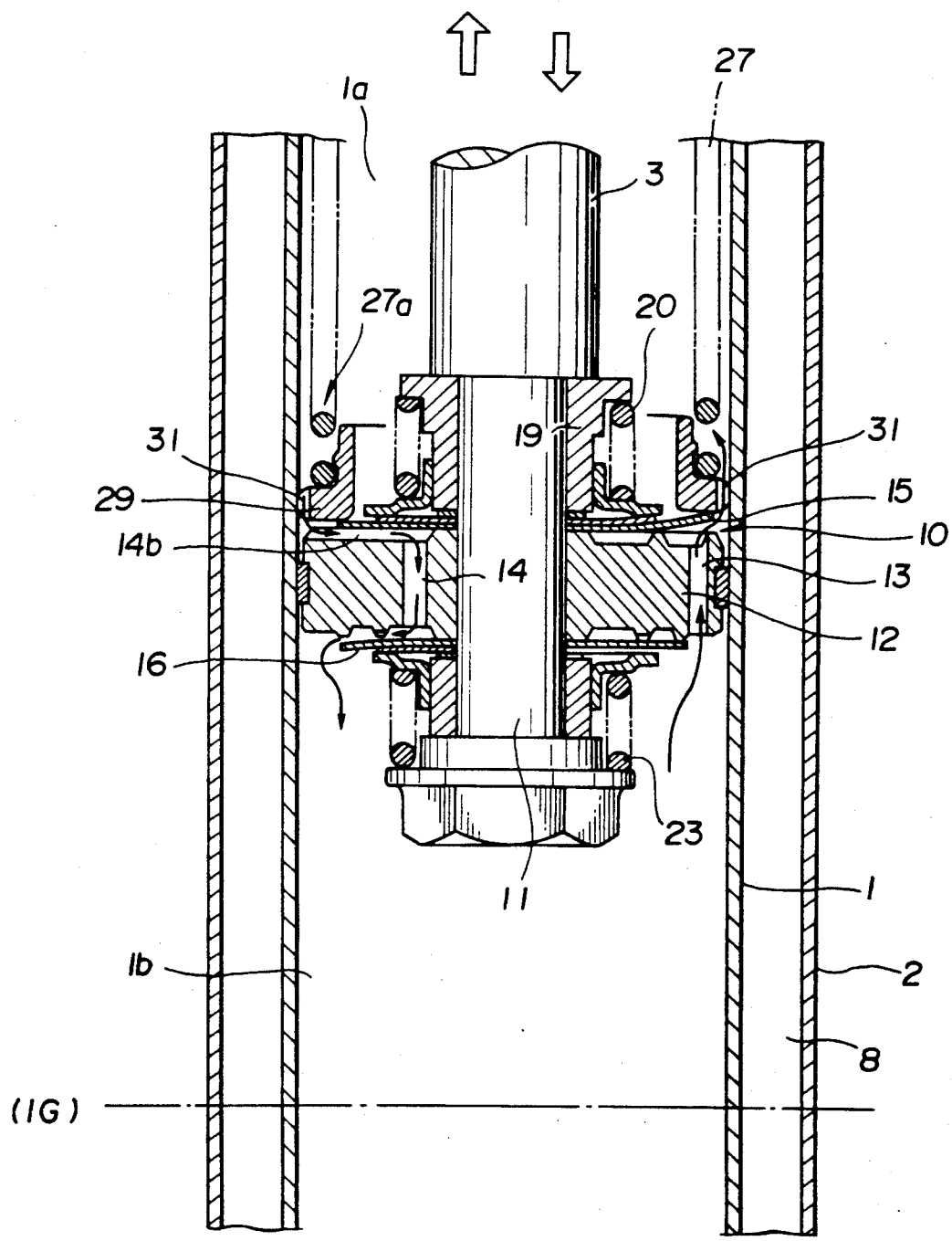
FIG. 2 is a partial section showing the first embodiment of the shock absorber in rebounding stroke.
Figure 3:
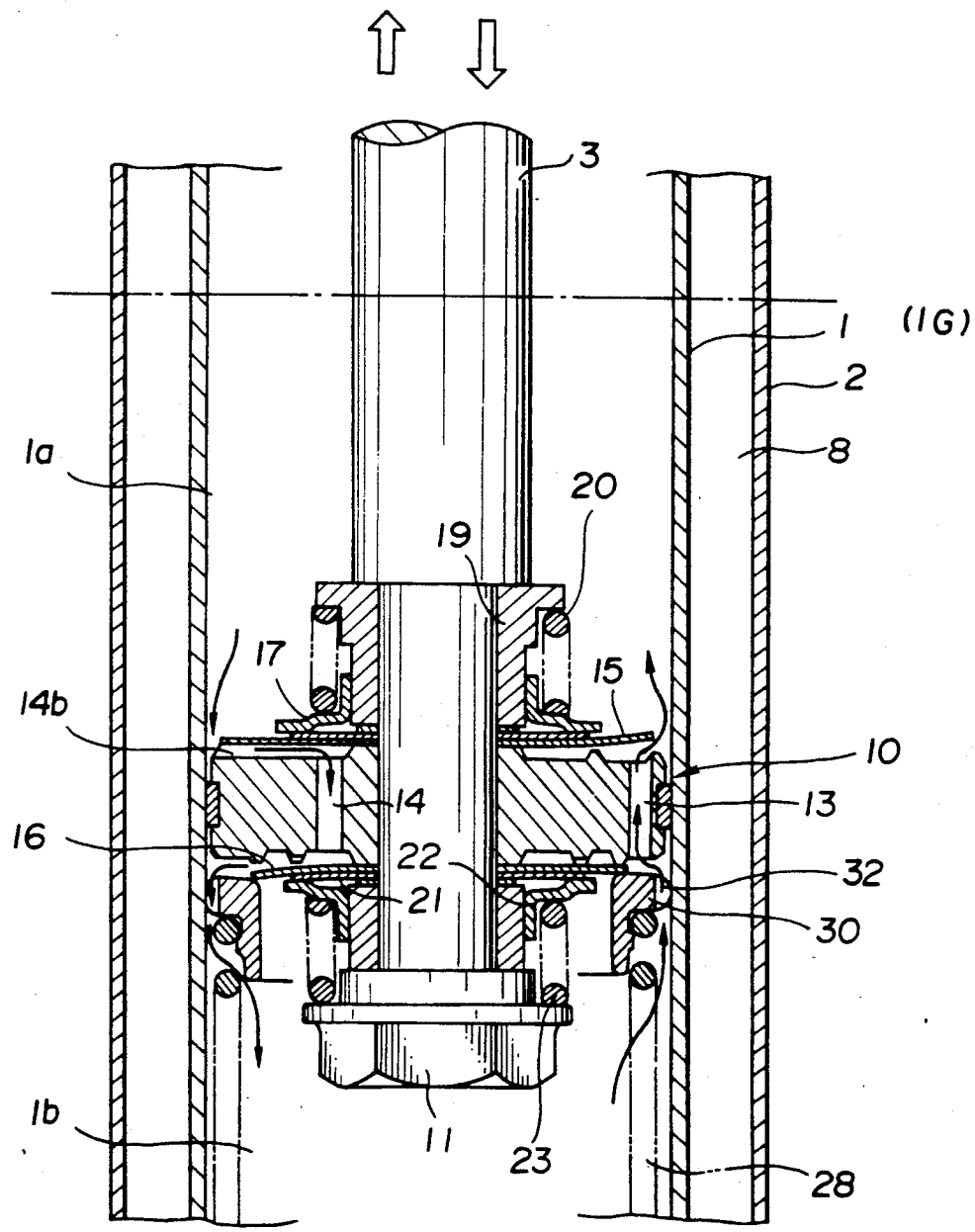
FIG. 3 is a partial section showing the first embodiment of the shock absorber in bounding stroke.
Figure 4A:
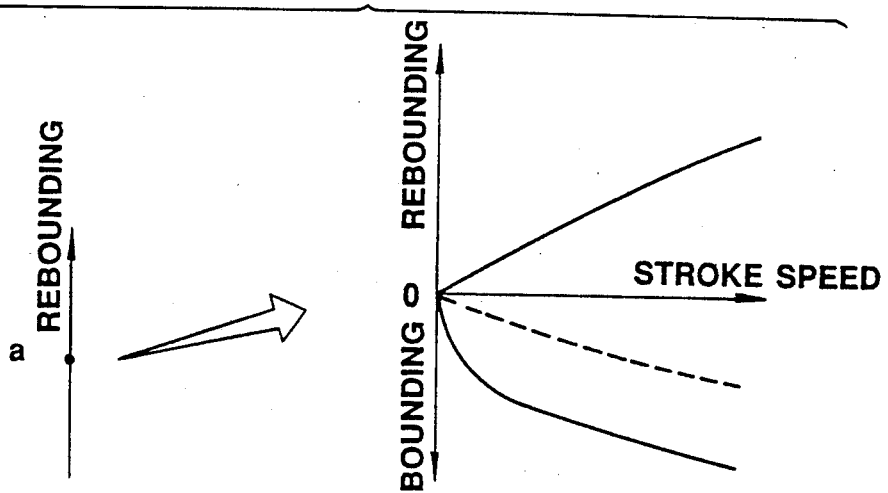
FIGS. 4(A), 4(B) and 4(C) are chart showing damping force variation characteristics at various stroke points of a piston.
Figure 4B:
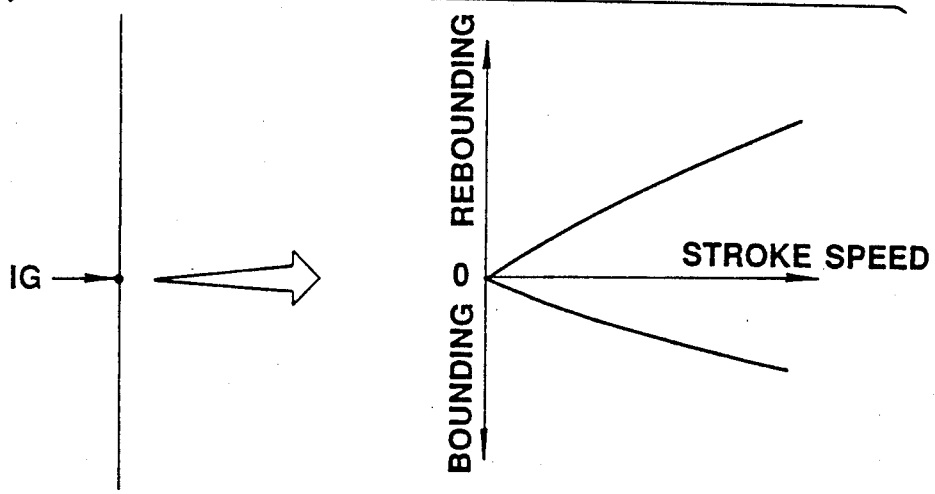
Figure 4C:
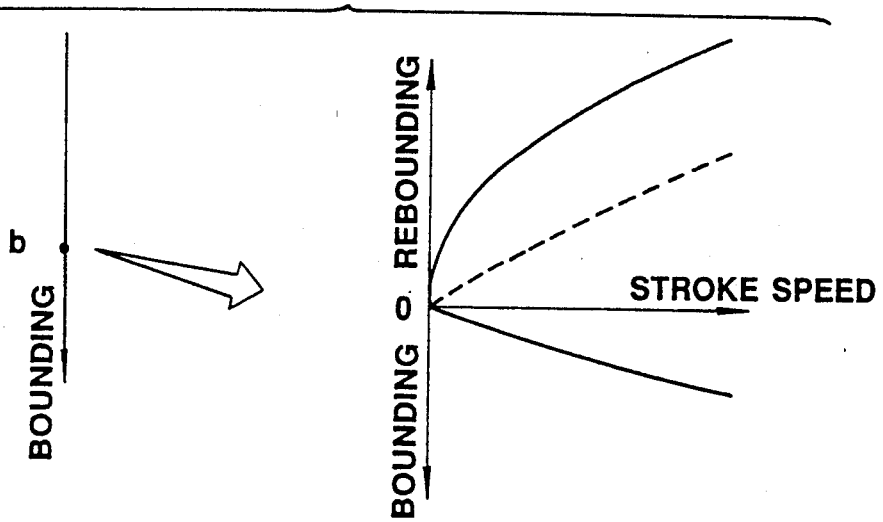

As can be seen, the length of the upper and lower auxiliary coil springs 27 and 28 are so selected as to place the annular valve seat members 29 and 30 in a spaced relationship at initial distances $x_1$ and $x_2$ when the piston 10 is in the neutral position and when the coil springs 27 and 28 are fully expanded. The distance $x_1$ and $x_2$ defines piston stroke ranges where none of the upper and lower spring assemblies 25 and 26 is active to exert the spring force for restricting deformation of the associated one of the upper and lower valve plates 15 and 16. As shown in FIG. 2, when the piston 10 strokes in bounding direction in a magnitude of stroke beyond the distance $x_1$, the upper spring seat member 29 comes into contact with the upper valve plate 15 to exert the spring force. On the other hand, as shown in FIG. 3, when the piston strokes in rebounding direction in a magnitude of stroke beyond the distance $x_2$, the lower spring seat member 30 comes into contact with the lower valve plate 15 for exerting spring force. In other words, as long as the piston stroke magnitude is smaller than the distance $x_1$ and $x_2$, the auxiliary coil springs 27 and 28 are held not active.

In the practical shock absorbing operation in piston bounding and rebounding stroke, flow restriction magnitude by the valve plate 15 and 16 at the initial stage of piston stroke within the range between $x_1$ and $x_2$, is principally determined by the deformation magnitude of the valve plates 15 and 16. In the shown embodiment, the radial orifice 14c having constant path area generates damping force which is variable in a rate proportional to square of the piston stroke speed in response to the piston rebounding stroke. At the same time, the variable orifice defined between the lower valve plate 16 and a contact surface 14e on the lower surface of the piston body 12, generates damping force which is variable in a rate proportional to $\frac{2}{3}$ power of the piston stroke speed. Since the constant orifice and the variable orifice are arranged in tandem or series, the integrated damping characteristics within the range defined between the points a which is spaced by a spaced $x_1$ from the neutral point 1G, and b which is distanced by a distance $x_2$ from the neutral point 1G, becomes substantially linearly proportional to the piston stroke speed, as shown in FIG. 5(B).

On the other hand, when the piston 10 strokes across the point a in rebounding stroke, the upper auxiliary coil spring 27 becomes active to exert the spring force onto the upper valve plate 15. The spring force exerted on the upper spring force restricts magnitude of deformation of the upper valve plate 15. Therefore, when the piston stroke direction is switched from the rebounding direction to bounding direction, the upper valve plate 15 is restricted in deformation. Therefore, damping force to be generated at the initial stage of piston bounding stroke becomes great. Subsequently, the variation ratio of the damping force in piston bounding stroke is gradually decreased according to decreasing of the spring force of the upper auxiliary coil spring 27, as shown in FIG. 5(A).

On the other hand, when piston strokes in bounding direction, since the constant orifice is not formed, the variation characteristics in a stroke range smaller than or equal to $x_2$, damping force to be generated varies in proportion to $\frac{2}{3}$ power of the piston stroke speed. Therefore, softer suspension characteristics than that obtained in the piston rebounding stroke can be obtained. Similarly to the aforementioned activity in the piston rebounding stroke, the lower valve plate 16 comes into contact with the lower spring seat member 30 when the piston strokes across the point b. By this the spring force of the lower auxiliary coil spring becomes active on the lower valve plate 16. Therefore, at the initial stage of bounding stroke switched from rebounding stroke, greater variation rate of the damping force, as shown in FIG. 5(C) is obtained.

As will be appreciated from the discussion given hereabove, substantially soft suspension characteristics can be obtained in response to relatively small magnitude of vibration which maintain the piston stroke within the range between points a and b. When the vibration magnitude is relatively greate to cause the piston stroke out of the aforementioned range, increased damping force can be generated at the initial stage of return stroke for effectively absorbing vibration energy. Therefore, shown embodiment can achieve both of the riding comfort and driving stability.

Figure 5A:
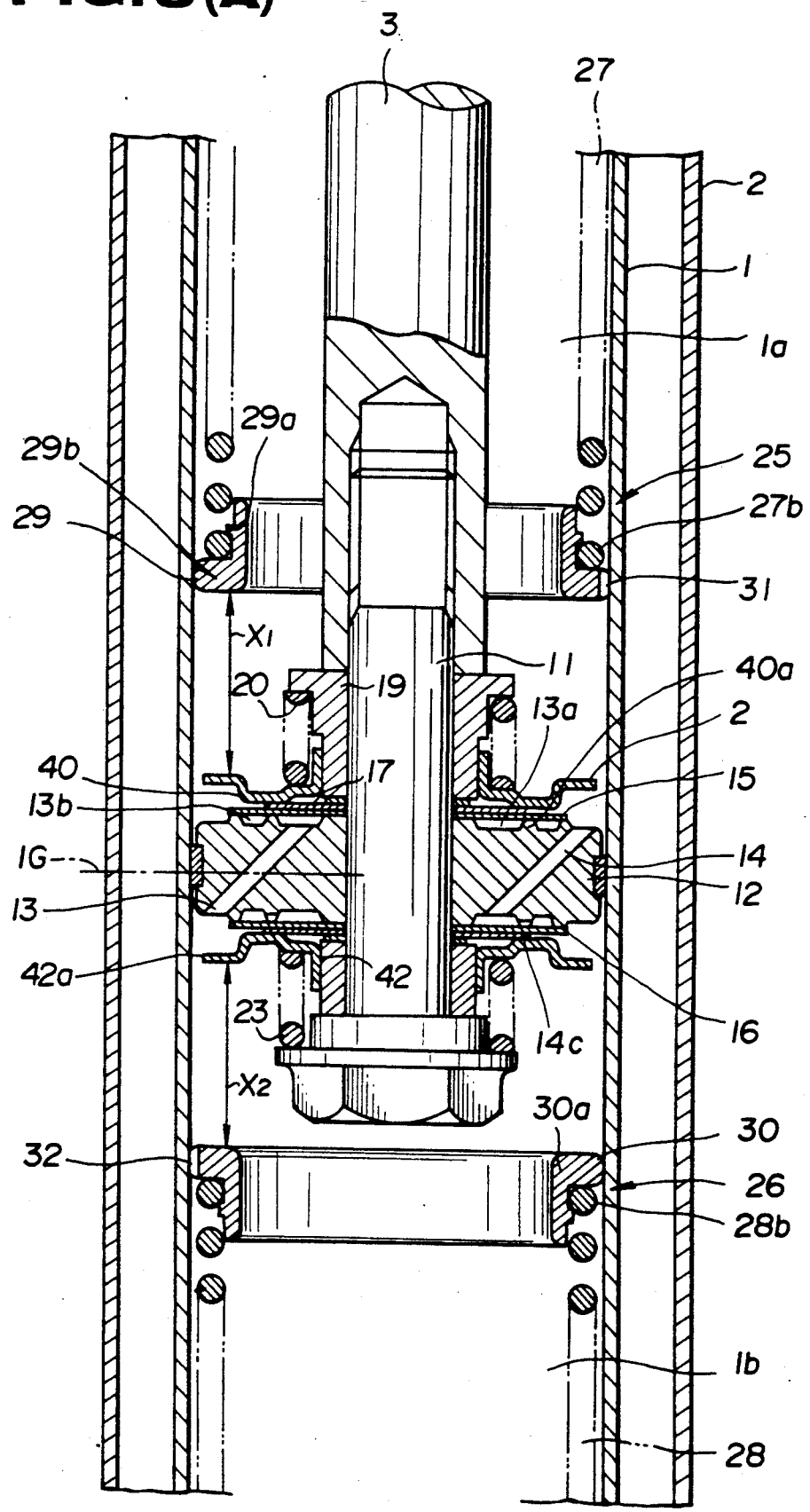
FIGS. 5(A), 5(B) and 5(C) are series of sections showing of the second embodiment of a variable damping force shock absorber according to the present invention.
Figure 5B:
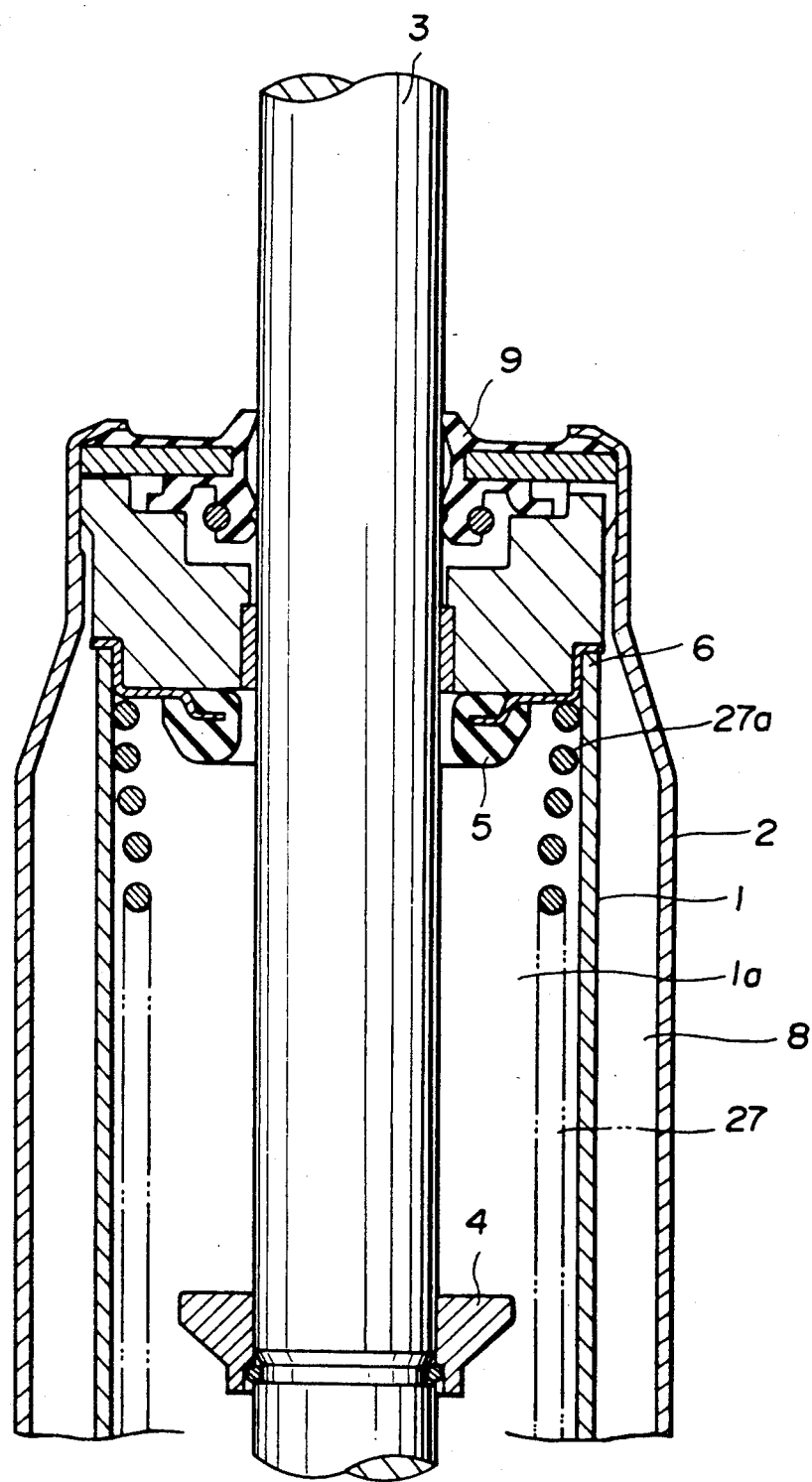
Figure 5C:
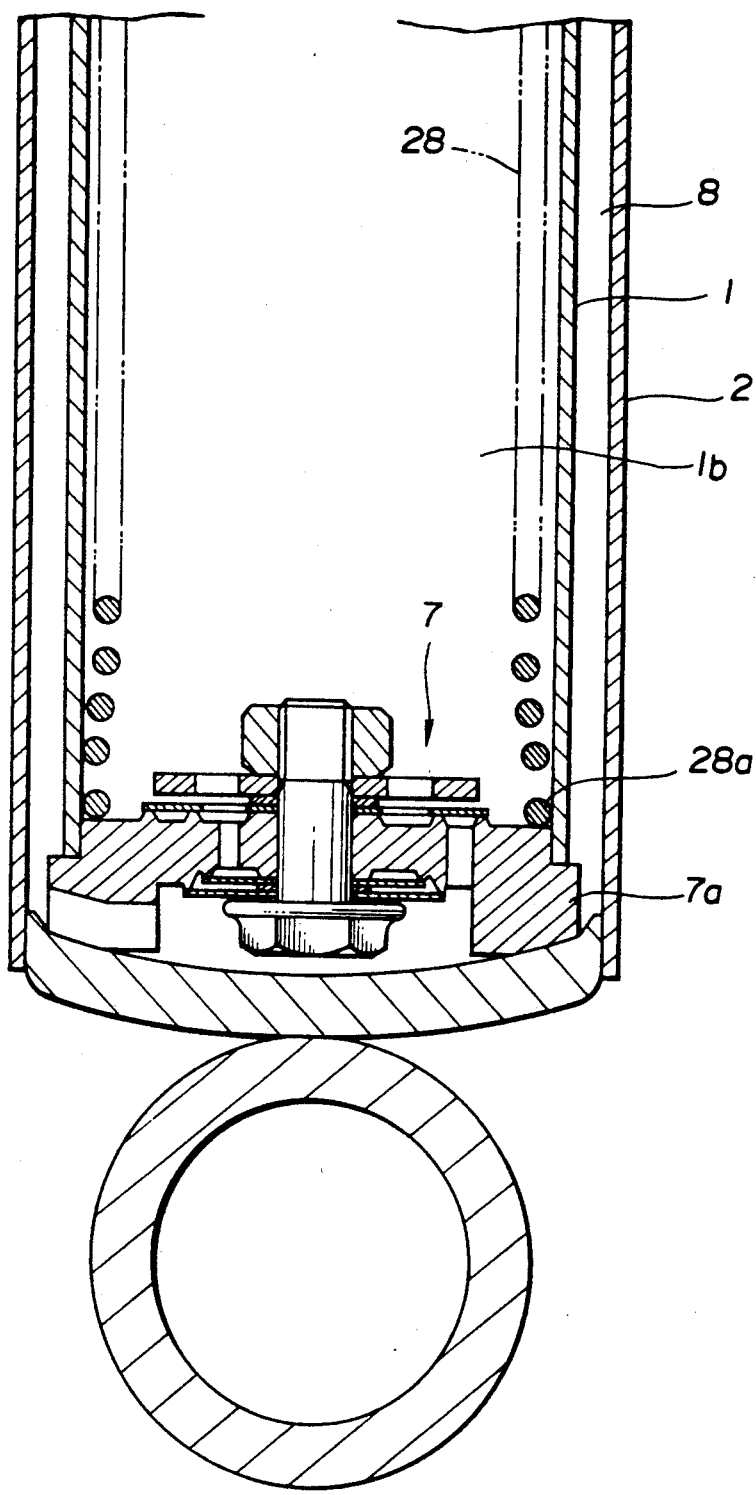

FIGS. 5(A) through 5(C) shows the second embodiment of the variable damping force shock absorber according to the present invention. In this embodiment, common components to that in the former embodiment will be represented by the same reference numerals to the former embodiment. The shown embodiment is principally differentiated from the former embodiment in the configuration of the spring seats 40 and 42.

As can be seen by comparison of FIG. 5(A) and FIG. 1(A), the spring seats 40 and 42 has greater diameter than that of the former embodiment. Respective spring seat 40 and 42 has inner seat surfaces for receiving the coil springs 20 and 23, and an outer seat surfaces 40a and 42a. The outer seat surfaces 40a and 42a are orientented at higher elevatiation relative to the associated surface of the piston body and is designed to contact with the upper and lower spring seat members 29 and 30.

Figures 7A, 7B, 7C:
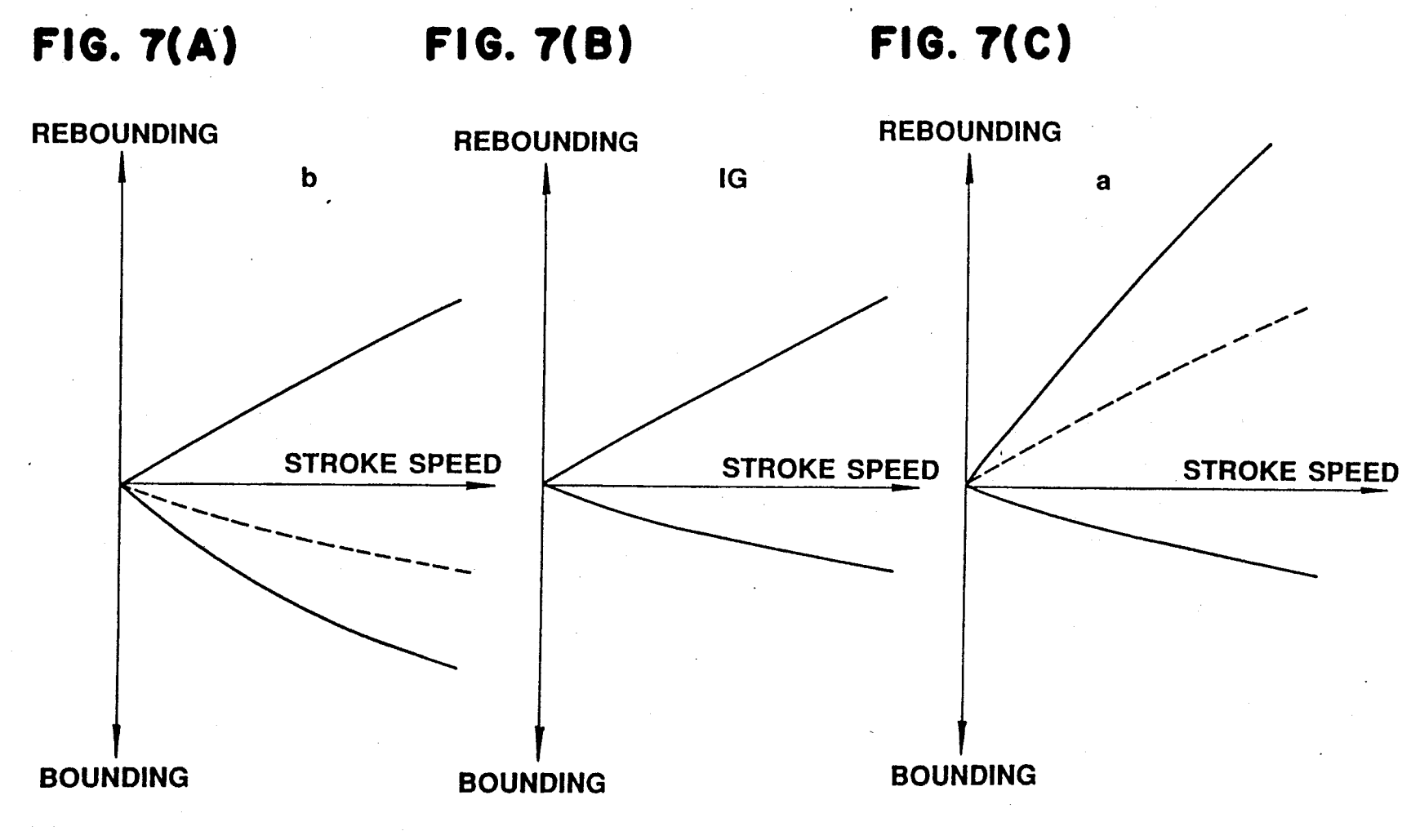
Figure 9:
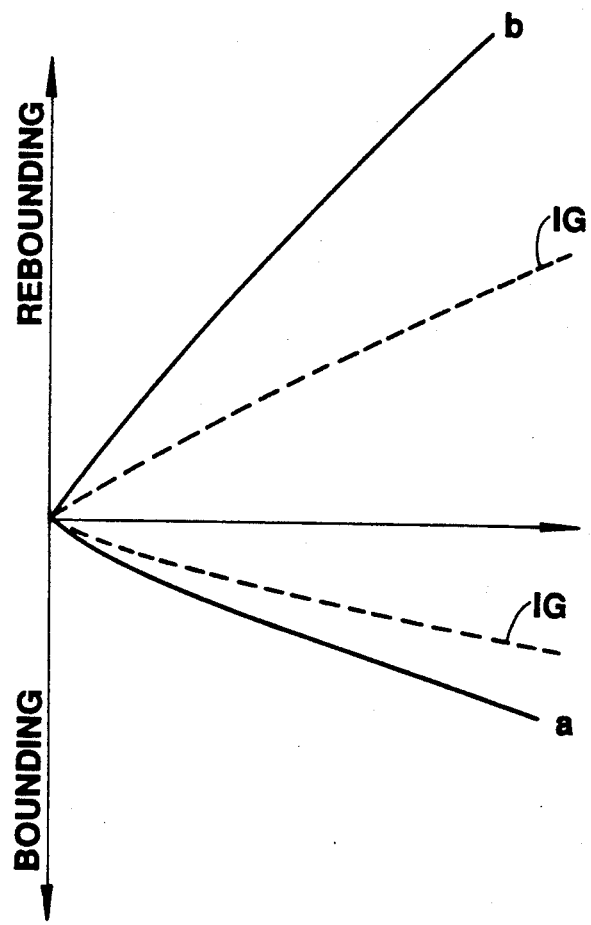
FIG. 9 is a chart showing variation characteristics of damping force to be generated by a bottom valve assembly in the shown embodiment.

Therefore, in the shown embodiment, the upper and lower auxiliary springs 29 and 30 are active on the upper and lower valve plates 15 and 16 via the smaller diameter discs 17 and 21. Therefore, similarly to the former embodiment, the upper coil spring 27 becomes active in response to the piston bounding stroke greater than $x_1$, as shown in FIG. 7(B), and the lower coil spring 28 becomes active in response to the piston rebounding stroke greater than $x_2$, as shown in FIG. 7(C). As a result, the spring force to be exerted on the valve plates 15 and 16 varies according to the characteristics of FIG. 7(A). As a result, the damping characteristics at respective stroke points a, 1G and b can be differentiated as shown in FIGS. 7(A), 7(B) and 7(C). Therefore, the shown embodiment can provide equivalent damping characteristics as that achieved by the former embodiment, as can be seen from FIG. 9.

Though the shown embodiment is directed to the flow restricting construction in the piston valve, the idea of the invention will be applicable not only for the piston valve but also for the bottom valve.

Figure 8:
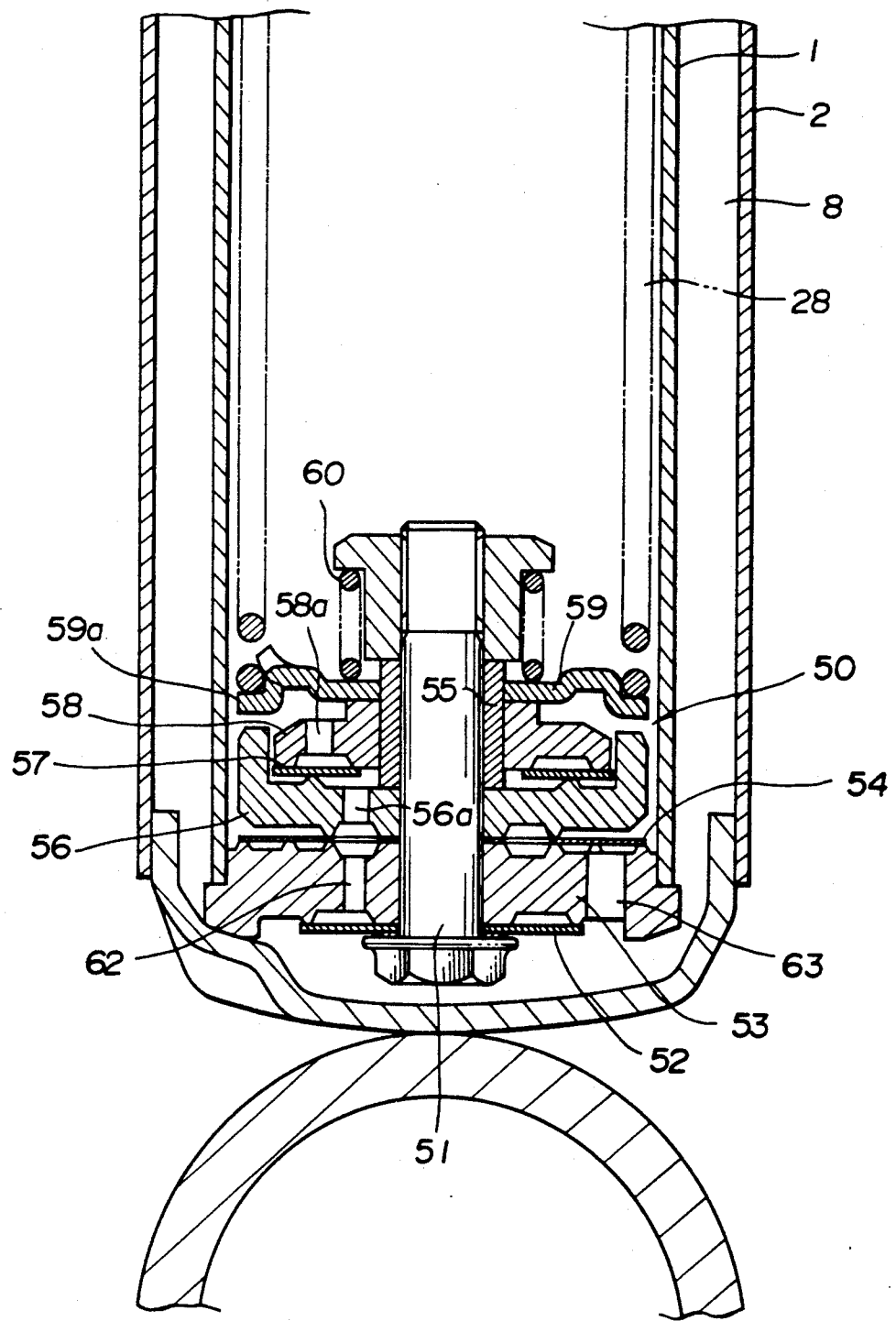
FIG. 8 is a partial section of a modification of the second embodiment of the shock absorber.

FIG. 8 shows a modification of the second embodiment of the shock absorber, in which the preferred construction of the auxiliary spring construction is applied to the bottom valve. In this construction, the bottom valve assembly 50 has a base body 53, a stationary valve plate 52, a check valve 54, a cylindrical sleeve 55, a lower valve retainer 56, a check valve 57, an upper valve retainer 58, a spring seat 59 and a valve spring 60 assembled into a valve assembly by means of a bolt 51. The upper and lower valve retainers 56 and 58 are formed with a fluid path openings 56a and 58a. The lower end of the fluid path opening 58a is resiliently closed by the check valve 57. Further the lower end of the opening 58a is allowed to communicate with a fluid path 62 via the check valve 57. The lower end of the fluid path 62 is resiliently closed by the stationary valve plate 52. On the other hand, the base body 53 is formed with a fluid path opening 63, upper end of which is closed by the check valve 54. The fluid path opening 63 is in communication with the lower fluid chamber via a clearance defined between the inner periphery of the inner cylinder 1 and the outer periphery of the lower valve retainer 56.

In the shown embodiment, an extension flange 59a is formed with the spring seat 59 for receiving the lower end of the lower auxiliary spring 28. While the piston 10 strokes within the range between $x_1$ and $x_2$, the spring force may not be exerted onto the spring seat 59. On the other hand, if the piston stroke becomes greater beyond the point $x_2$, the spring force of the lower auxiliary spring 28 becomes effective on the spring seat 59 and thus active on the upper spring seat 56 for restricting deformation thereof.

As can be appreciated, the shown construction is active for generating greater increasing ratio of the damping force in response to the piston bounding stroke subsequent to the piston rebounding stroke in relatively great magnitude.

Figure 10A:
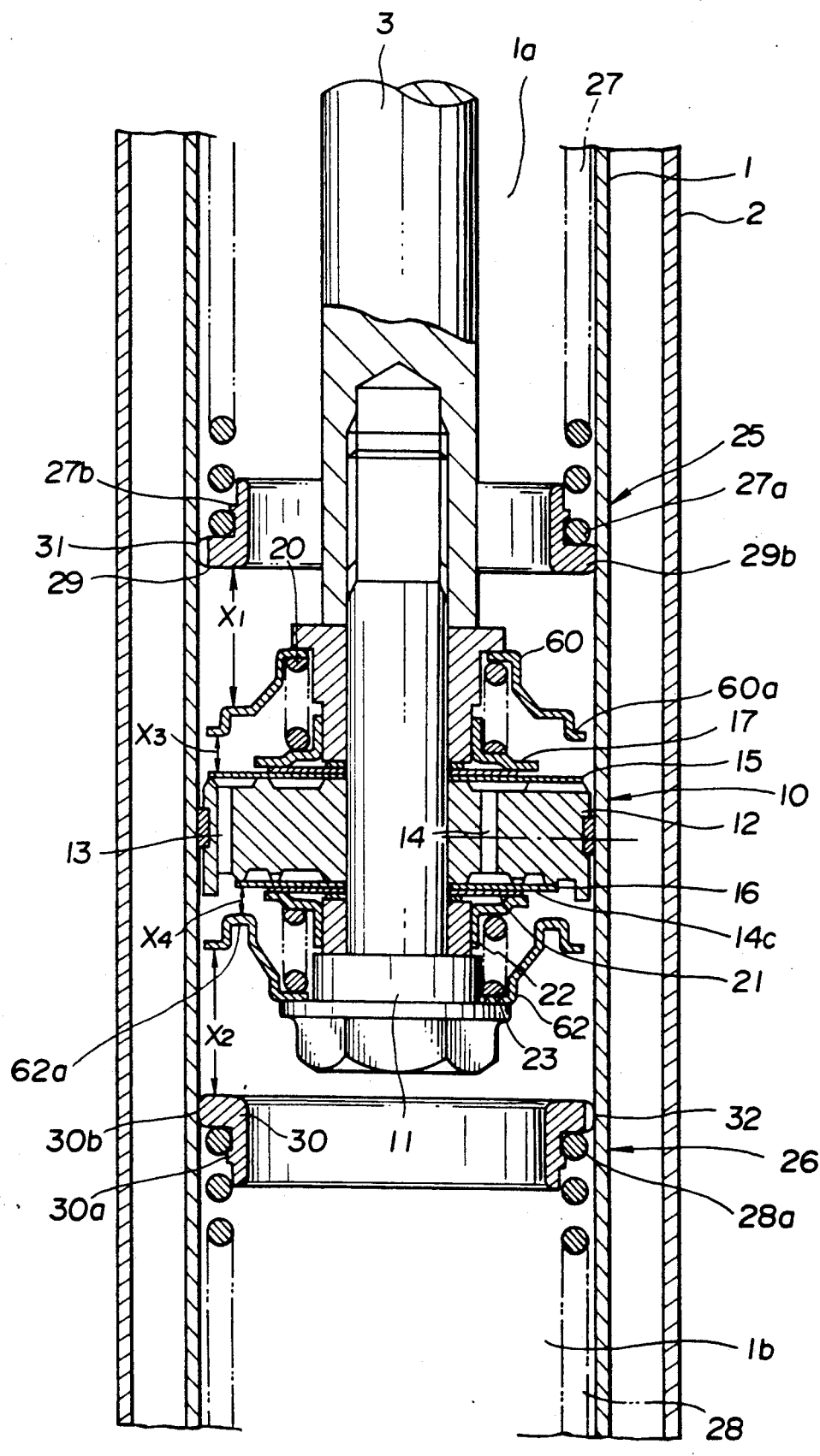
FIGS. 10(A), 10(B) and 10(C) are series of sections showing the third embodiment of a variable damping force shock absorber according to the present invention.
Figure 10B:
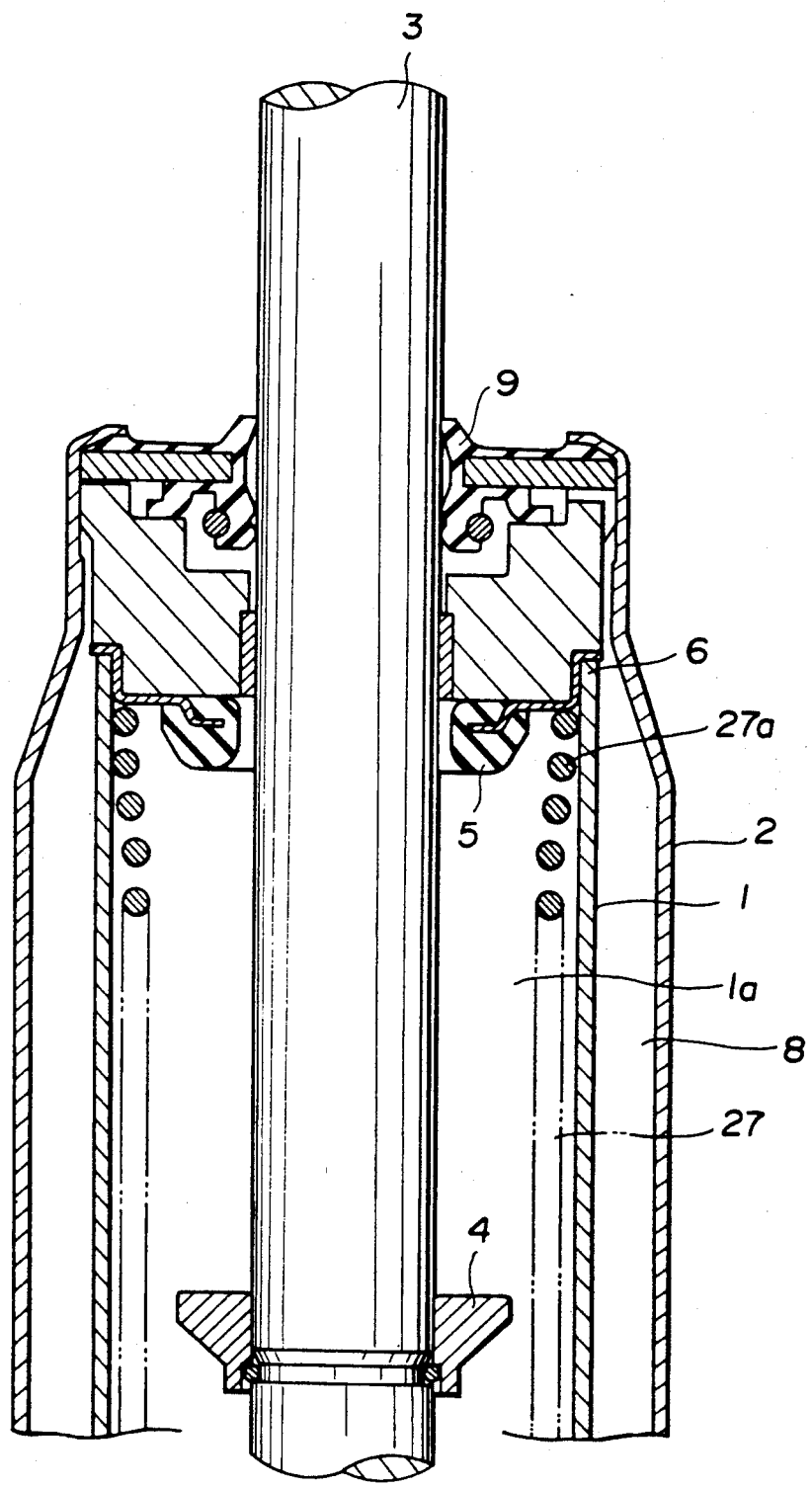
Figure 10C:
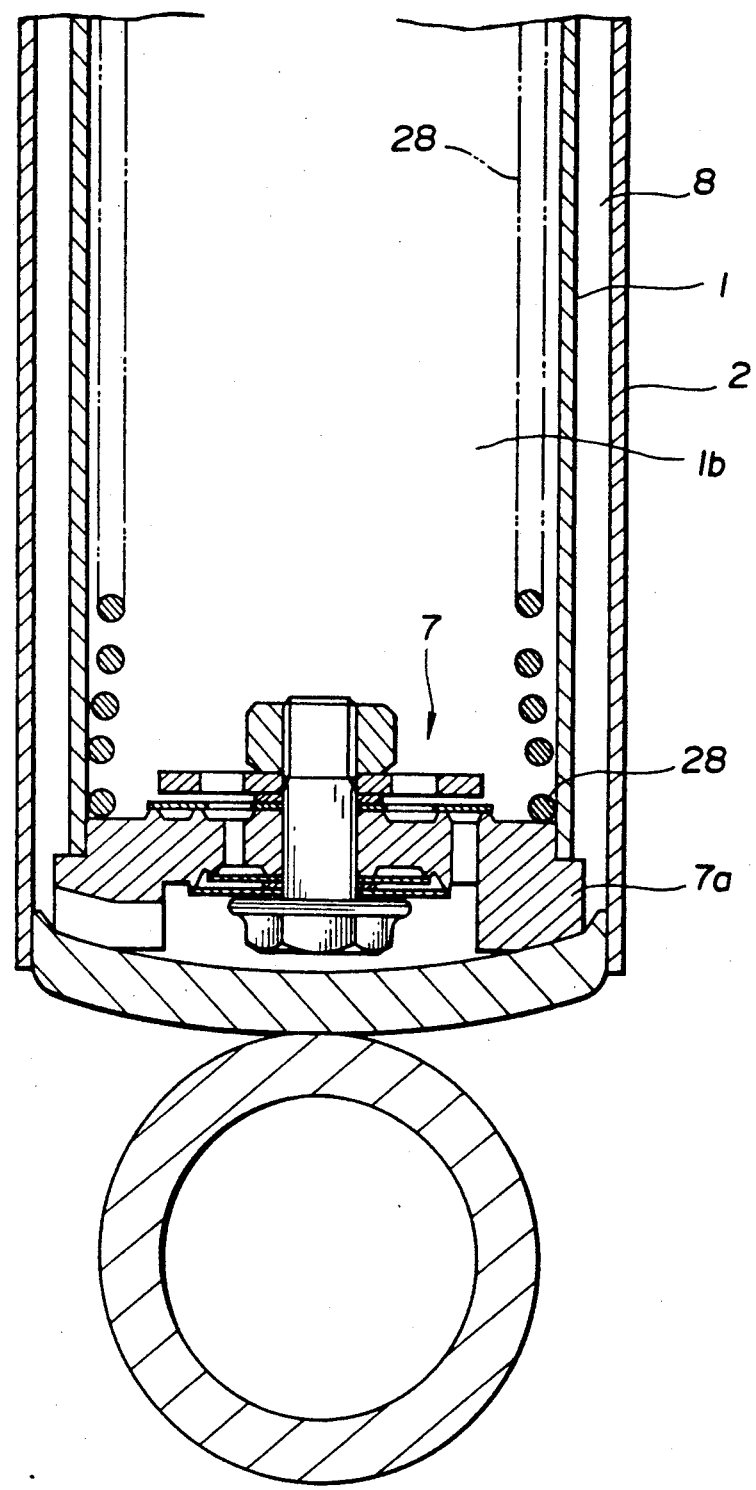
Figure 11A:
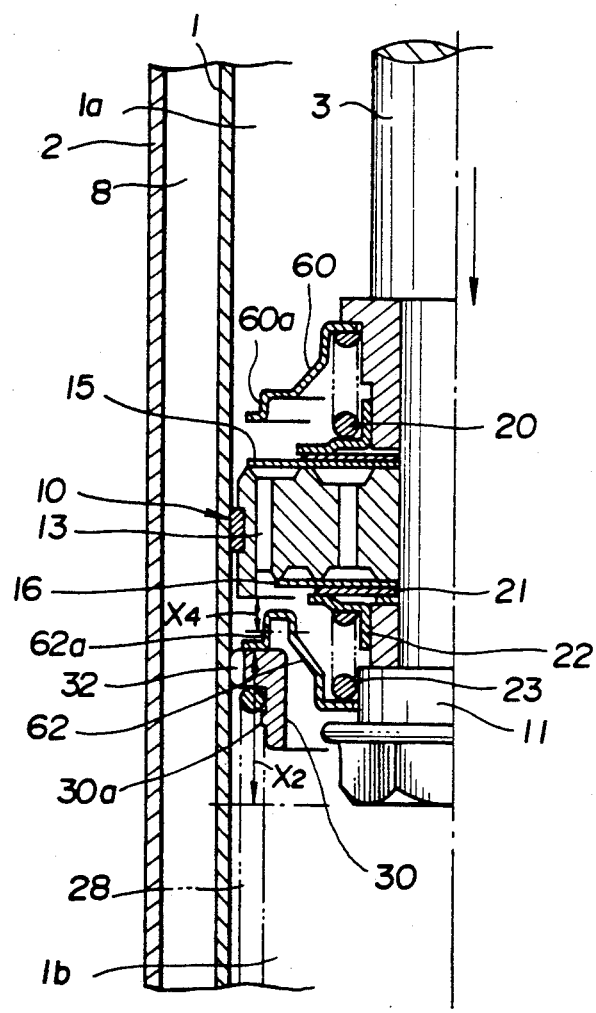
FIGS. 11(A) and 11(B) are partial sections of the third embodiment of the shock absorber, showing activity of an auxiliary coil spring during piston rebounding stroke.
Figure 11B:
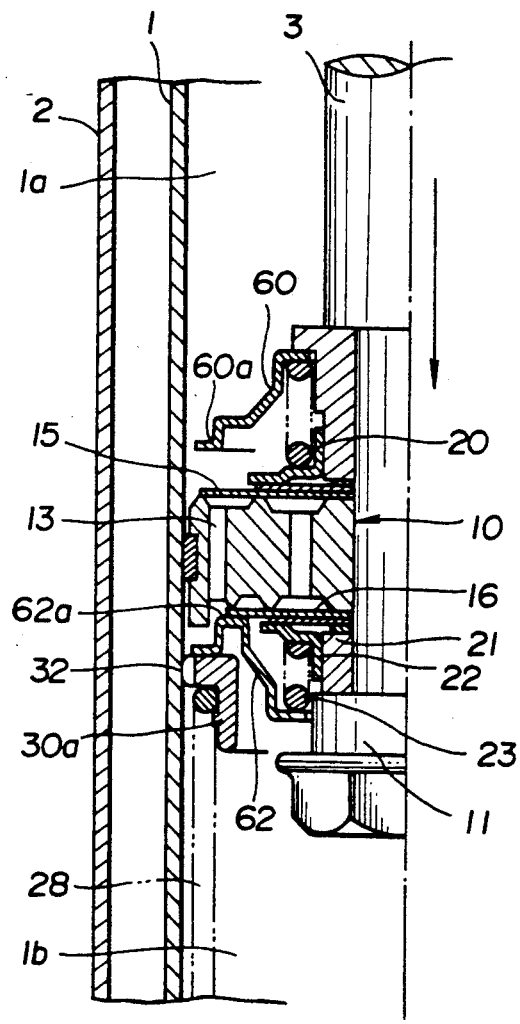

FIGS. 10(A), 10(B) and 10(C) show the third embodiment of the variable damping force shock absorber according to the present invention. In this embodiment, an upper spring seat 60 is provided for receiving the upper end of the coil spring 20. Also, a lower spring seat 62 is provided for receiving the lower end of the coil spring 23. As can be seen from FIG. 10(A), the distance between the annular spring seat members 29 and 30 and the mating surfaces 60a and 62a are respectively $x_1$ and $x_2$. On the other hand, the distances of the circumferential edge portion of the upper and lower spring seats 60 and 62 and the associated valve plates 15 and 16 are respectively $x_3$ and $x_4$. The upper and lower auxiliary spring assemblies 25 and 26 are thus initially active on these upper and lower spring seats 60 and 62 when piston stroke becomes greater than $x_1$ as shown in FIG. 11(A). Then, by further piston stroke, the spring seat 60 and 62 comes into contact with the associated valve plate 15 and 16, as shown in FIG. 11(B).

Figure 12A:
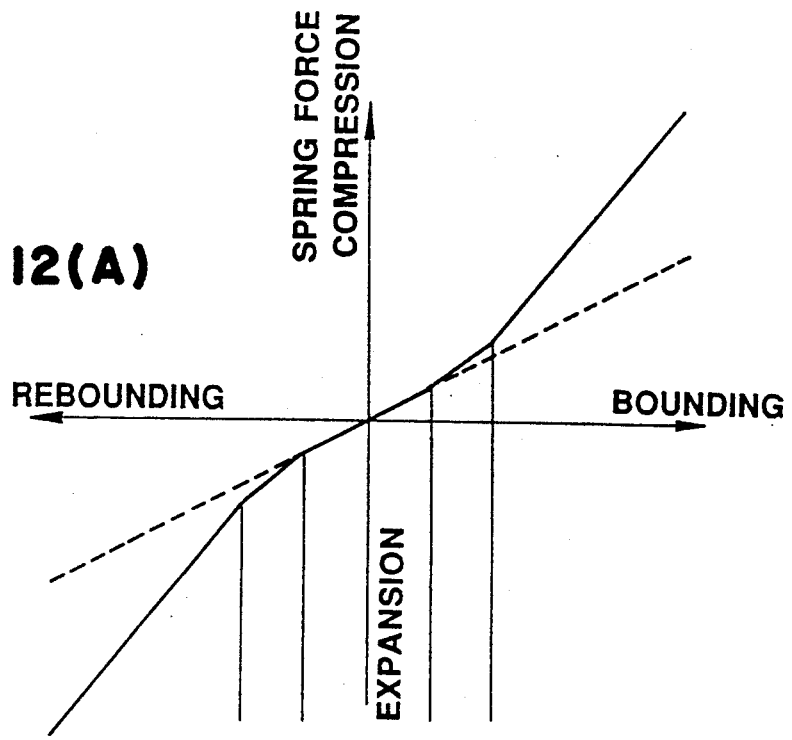
FIGS. 12(A), 12(B) and 12(C) are chart showing active ranges of springs.
Figure 12B:
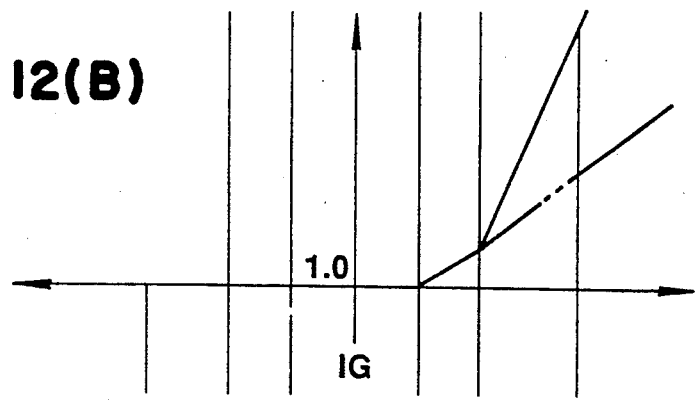
Figure 12C:
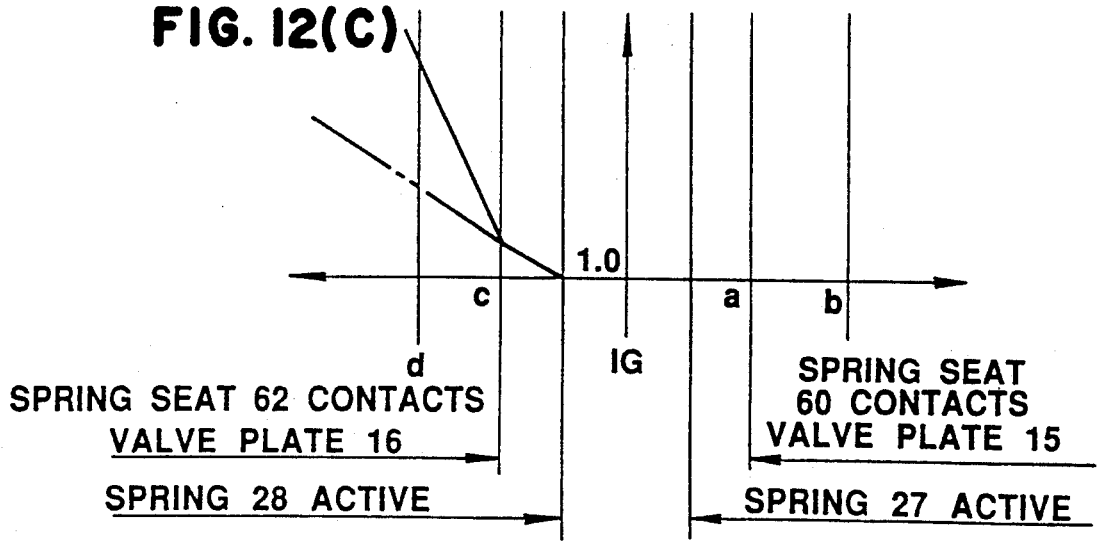

With this construction substantially the same or equivalent effect to the former embodiment can be obtained. Furthermore, variation of spring force varying variation ratio twice at respective points a, b and c, d as illustrated in FIGS. 12(A) through 12(C) can be obtained. By variation of spring characteristics as set forth, variation of the damping force as illustrated in FIGS. 13(A), 13(B), 13(C) and 13(D) can be obtained. As can be appreciated herefrom, with the shown construction, substantially great damping force can be obtained in the return stroke after bounding or rebounding stroke beyond the predetermined magnitude.

Therefore, according to the invention, relatively soft suspension characteristics can be provided in response to substantially small magnitude of vibration and can provide sufficient damping force in response to the vibration beyond a predetermined magnitude. Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A variable damping force shock absorber for an automotive suspension, said shock absorber comprising:
   a cylinder with a cylindrical inner wall;
   a piston rod;
   a piston body secured to said piston rod and reciprocally moveable within said cylinder and defining within said cylinder a first chamber and a second chamber which are filled with a damping hydraulic fluid, said piston having a first axial end surface adjacent said first chamber and a second axial end surface adjacent said second chamber,
   said piston body being formed with a first through passage having one end communicable with said second chamber, said piston body being formed also with a second through passage having one end communicating with said second chamber and an opposite end communicable with said first chamber;
   a first piston valve mounted to said piston body and including a first valve plate seated on said first axial end surface and covering said opposite end of said second through passage;
   a second piston valve mounted to said piston body and including a second valve plate seated on said second axial end surface and covering said opposite end of said first through passage;
   a first spring mechanism disposed in said first chamber of said cylinder, said first spring mechanism being constructed and arranged such that during a return stroke of said piston body after said piston has displaced in a first direction to reduce a volume of said first chamber from a neutral position of said piston body, said first valve plate is subject to a spring force by said first spring mechanism; and
   a second spring mechanism disposed in said second chamber of said cylinder, said second spring mechanism being constructed and arranged such that during a return stroke of said piston body after said piston body has displaced in a second direction opposite to said first direction to reduce a volume of said second chamber from said neutral position of said piston body, said second valve plate is subject to a spring force by said second spring mechanism;

each of said first and second spring mechanisms including an annular spring seat slidably engageable with said inner wall of said cylinder for reciprocal motion within said cylinder, a spring having one end acting on said annular spring seat and retaining said annular spring seat within said cylinder, and means for reducing friction between said annular spring seat and said inner wall of said cylinder during said reciprocal motion, said friction reducing means including grooves formed in said annular spring seat.

2. A variable damping force shock absorber as claimed in claim 1, wherein each of said first and second axial end surfaces of said piston body is formed with an annular radially outer groove and a radially inner groove surrounded by said outer groove.

3. A variable damping force shock absorber as claimed in claim 2, wherein said opposite end of said first through passage is open to said inner groove with which said second axial end surface is formed, and said opposite end of said second through bore is open to said inner groove with which said first axial end surface is formed.

4. A variable damping force shock absorber as claimed in claim 3, wherein said first valve plate of said first piston valve is an annular valve plate having a diameter large enough to cover said inner and outer grooves with which said first axial end surface is formed, and said second valve plate of said second piston valve is an annular valve plate having a diameter large enough to cover said inner and outer grooves with which said second axial end surface is formed.

5. A variable damping force shock absorber as claimed in claim 4, wherein said first piston valve includes a first annular valve disc lying on said first valve plate and having a diameter large enough to cover said inner groove of said first axial end surface and an outer peripheral edge portion disposed between said inner groove and said annular outer groove of said first axial end surface, a first coil spring, and a first spring retainer interposed between said first coil spring and said outer peripheral edge portion of said first valve plate to apply a spring force of said first coil spring to said outer peripheral edge portion of said first valve disc.

6. A variable damping force shock absorber as claimed in claim 5, wherein said second piston valve includes a second annular valve disc lying on said second valve plate and having a diameter large enough to cover said inner groove of said second axial end surface and an outer peripheral edge portion disposed between said inner groove and said annular outer groove of said second axial end surface, a second coil spring, and a second spring retainer interposed between said second coil spring and said outer peripheral edge portion of said second valve disc to apply a spring force of said second coil spring to said outer peripheral edge portion of said second valve disc.

7. A variable damping force shock absorber as claimed in claim 6, wherein said annular spring seat of said first spring mechanism is engageable directly with said first valve plate to apply said spring force of said first spring mechanism directly to said first valve plate.

8. A variable damping force shock absorber as claimed in claim 7, wherein said annular spring seat of said second spring mechanism is engageable directly with said second valve plate to apply said spring force of said second spring mechanism directly to said second valve plate.

9. A variable damping force shock absorber as claimed in claim 6, wherein said annular spring seat of said first spring mechanism is engageable with said first spring retainer to apply said spring force of said first spring mechanism to said outer peripheral edge portion of said first valve plate.

10. A variable damping force shock absorber as claimed in claim 9, wherein said annular spring seat of said second spring mechanism is engageable with said second spring retainer to apply said spring force of said second spring mechanism to said outer peripheral edge portion of said second valve plate.

11. A variable damping force shock absorber as claimed in claim 6, wherein said annular spring seat of said first spring mechanism is engageable with said first coil spring to apply said spring force of said first spring mechanism to said outer peripheral edge portion of said first valve plate via said first coil spring.

12. A variable damping force shock absorber as claimed in claim 11, wherein said annular spring seat of said second spring mechanism is engageable with said second coil spring to apply said spring force of said second spring mechanism to said outer peripheral edge portion of said second valve plate via said second coil spring.

* * * * *